US006073836A

United States Patent [19]

Kleppa

[11] Patent Number: 6,073,836

[45] Date of Patent: Jun. 13, 2000

[54] GATE READER FOR READING A MAGNETIC MEDIUM

[76] Inventor: Hans M. Kleppa, Skjellstadhagen 20, N-1380 Heggedal, Norway

[21] Appl. No.: 09/351,185

[22] Filed: Jul. 12, 1999

Related U.S. Application Data

[63] Continuation of application No. 08/776,690, Feb. 20, 1997, Pat. No. 5,939,696.

[30] Foreign Application Priority Data

Aug. 23, 1994 [NO] Norway .................................... 943098

[51] Int. Cl.[7] ...................................................... G06F 17/00

[52] U.S. Cl. .......................... 235/375; 235/384; 235/382; 235/475

[58] Field of Search .................................... 235/384, 381, 235/380, 449, 439, 475, 494, 375

[56] References Cited

U.S. PATENT DOCUMENTS

| | | | |
|---|---|---|---|
| 3,622,995 | 11/1971 | Dilks et al. | 235/382 |
| 3,958,103 | 5/1976 | Oka et al. | 235/384 |
| 4,196,846 | 4/1980 | Kao et al. | 235/475 |
| 4,357,530 | 11/1982 | Roes et al. | 235/384 |
| 4,377,828 | 3/1983 | Hayman et al. | 235/475 |
| 4,384,196 | 5/1983 | McCumber et al. | 235/375 |
| 4,535,892 | 8/1985 | Roes et al. | 235/384 |
| 4,549,077 | 10/1985 | Kataoka | 235/384 |
| 4,684,792 | 8/1987 | Nickels, Jr. | 235/384 |
| 4,798,942 | 1/1989 | Aubrey | 235/384 |
| 4,900,906 | 2/1990 | Pusic | 235/381 |
| 4,918,298 | 4/1990 | Tanabe et al. | 235/384 |
| 4,977,502 | 12/1990 | Baker et al. | 235/384 |
| 4,992,647 | 2/1991 | Konishi et al. | 235/379 |
| 5,010,240 | 4/1991 | Sheldon | 235/380 |
| 5,043,561 | 8/1991 | Kimata | 235/384 |
| 5,168,150 | 12/1992 | Plouzennec et al. | 235/475 |
| 5,237,340 | 8/1993 | Nelson | 346/108 |
| 5,268,561 | 12/1993 | Kimura et al. | 235/384 |
| 5,414,249 | 5/1995 | Matsumoto | 235/384 |

FOREIGN PATENT DOCUMENTS

| | | | |
|---|---|---|---|
| 0 271 022 | 6/1988 | European Pat. Off. | 235/384 |
| 3-257598 | 11/1991 | Japan | 235/384 |
| 4-262485 | 9/1992 | Japan | 235/384 |

*Primary Examiner*—Michael G Lee
*Assistant Examiner*—Diane I. Lee
*Attorney, Agent, or Firm*—Young & Thompson

[57] ABSTRACT

A gate reader consists of a medium-insertion station/slot and an ejection opening (3), internal pathway (4, 10) for control and transport of a data-carrying medium inserted into the insertion station/slot (2) towards the ejection opening (3), decoding and updating device (8, 17) in the path (4) for reading the data, and a control device for controlling the read data. The gate reader is connected to a computer processing unit for delivery of information necessary for processing of medium-information. Furthermore, the gate reader may include a graphical printing-mechanism (14) for visual print of information on the inserted medium or on a slip delivered from a hopper (12), a slip-hopper (12), and a device for delivery of a slip from the hopper to the internal pathway (4, 10), and a mechanism for activating the slip-delivery device.

9 Claims, 1 Drawing Sheet

GATE READER FOR READING A MAGNETIC MEDIUM

CROSS-REFERENCE TO RELATED APPLICATIONS

This application is a continuation of application Ser. No. 08/776,690, filed Feb. 20, 1997, U.S. Pat. No. 5,939,696.

The invention relates to a gate reader, and more particularly to an exit-reader or ticket-reader.

BACKGROUND OF THE INVENTION

The invention is especially developed in connection with such devices as are found at passenger gate-exits at airports, but is not limited to such exclusive use, as the invention is suitable within a broader aspect where one has exit-entry-points or control-points that require a form of advanced control of who, or at least how many, that shall pass, or pass the control-point.

A gate reader is usually a device that consists of an insertion opening and an ejection opening for a ticket, internal pathway means for control and transport of the data-carrying ticket inserted into the insertion opening, towards the ejection opening, decoding and re-coding means in the path for reading of the data, and control means for control of the read data, as all means are connected to a computer as Processing Unit for delivery of information necessary for processing of ticket-data.

If the decoded data is accepted, it means that the customer is permitted to pass. If the data is invalid, the customer must in today's environment make contact with or be contacted by a service-agent that assists with updating and/or re-issuing of a valid ticket. This occurs in a separate device connected to a Central Processing Unit. This personnel intensive service-operation takes a relatively long time, and requires interaction between customer and service-agent/operator and will often result in queues forming.

Another problem with today's equipment is that even though the data stored on the magnetic-stripe usually is presented on the front-side of the ticket, in normal graphical print-characters, today's equipment is such that some of this data can be updated or revalidated at a later point in time than the actual issuance of the physical ticket, for issuance in the gate reader. A good example could be seat-specification. Such an update can be performed by various known gate readers, which are connected to a Central Processing Unit, and the update will not present any major problem on the magnetic-stripe, but it is a chaotic disadvantage that such updating is not made visually available for the holder of the ticket, in the correct field on the ticket front-side.

Based on this techniques current state it is therefore an objective of the invention to create a means by which the customer him/herself can perform or see to the performing of the necessary operations related to revalidation or updating, and that means are available to enable visual information of the performed alternation, in the correct field on the tickets front-side.

This is achieved according to the invention by two clearly separate devices, whereof one until now has been agent/operator controlled, being united in one and the same device, which is a gate reader, explicitly so that in a gate reader is integrated a graphic printer for visual denoting ticket-relevant information on the inserted slip or respectively for visual denoting on a hopper expedited slip, which then is delivered updated to the customer. This last mentioned option is usually only relevant if the customer has not identified him/herself with a ticket.

SUMMARY OF THE INVENTION

With the invention one thereby achieves an improved boarding/exiting procedure where the customer him/herself is operator or user and the customer when the information is invalid, receives an updated ticket or control-slip, with visual information of the alternations. As long as the customer rightfully should pass, the customer will in other words not just be permitted to pass when the ticket-information is valid, but also when ticket-information is invalid!

By rightfully is meant that the customer has identified him/herself by use of his/her ticket, but the new gate reader also makes possible a system where the customer or passenger does not necessarily have a ticket or control-slip. If he or she can identify him/herself by means of another medium, for instance a plastic card of some type, then the gate reader can be disposed that it will interpret card information decoded by a connected or integrated card-reader and issue a control-slip or ticket with the necessary information.

From U.S. Pat. No. 4,992,647 is known a system that includes a card-reader. That concerns an original-issue machine, and not a machine that is used to control an actual embarkation/exit-point. Based on the decoded standardized magnetic-stripe is determined whether or not there is space for updating of the manually supervised new data. If not, a new document is produced, which then replaces the previous.

DESCRIPTION OF THE DRAWINGS

The invention will now be described in more detail with reference to the drawings, where.

DESCRIPTION OF THE PREFERRED EMBODIMENT

Figure 1:
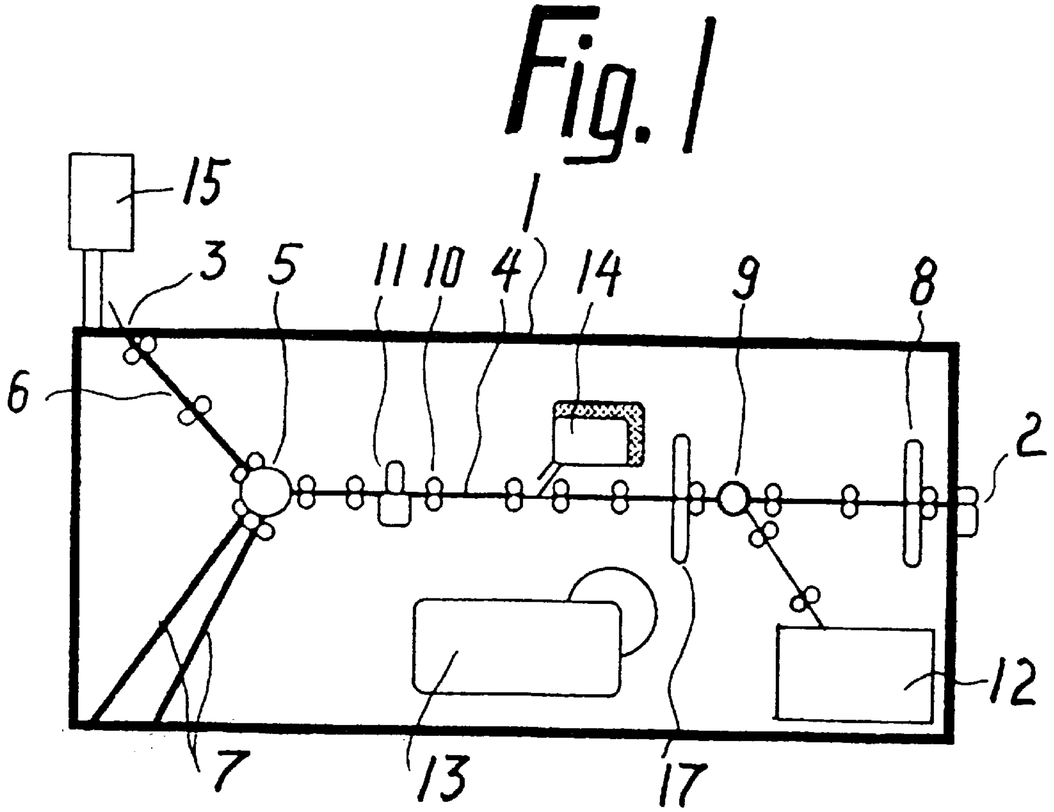
FIG. 1 schematically shows a vertical cross-section of a gate reader according to the invention.

According to the invention, the new gate reader comprises a housing 1 with an insertion opening 2 for a ticket and an ejection opening 3 where the customer receives the ticket or new ticket respectively returned or issued. Within the housing is a pathway via which the inserted ticket is controlled and transported. The pathway is indicated by line 4 within the housing shown in the FIG. 1 cross-section. At a sorting station 5 the pathway 4 is split into an exit-path 6 towards the ejection opening 3 and into two or more paths 7 which go to storage bins (not shown).

Pathway 4 is comprised of, seen from the insertion opening 2, a magnetic decode/coding mechanism 8, a sorting station/mechanism 9, directional pincer-rollers 10, a paper-cutting mechanism 11, and then another sorting station/mechanism 5 (described above). In addition of course the gate reader consists of other mechanisms, including numerous directional pincer-rollers, but the here mentioned and shown means are those that are material towards understanding the invention.

In the housing 1 is furthermore arranged a hopper 12 for blank tickets or control-slips, which can be fed as indicated by the stapled line to the sorting station/mechanism 9 and in that manner steered onto pathway 4. Furthermore there is with means 13 indicated operational electronics, fans, etc.

What particularly characterizes the gate reader, in addition to the hopper 12, is the crucial graphic printing-module 14, such that the result is a gate reader printer.

Figure 2:
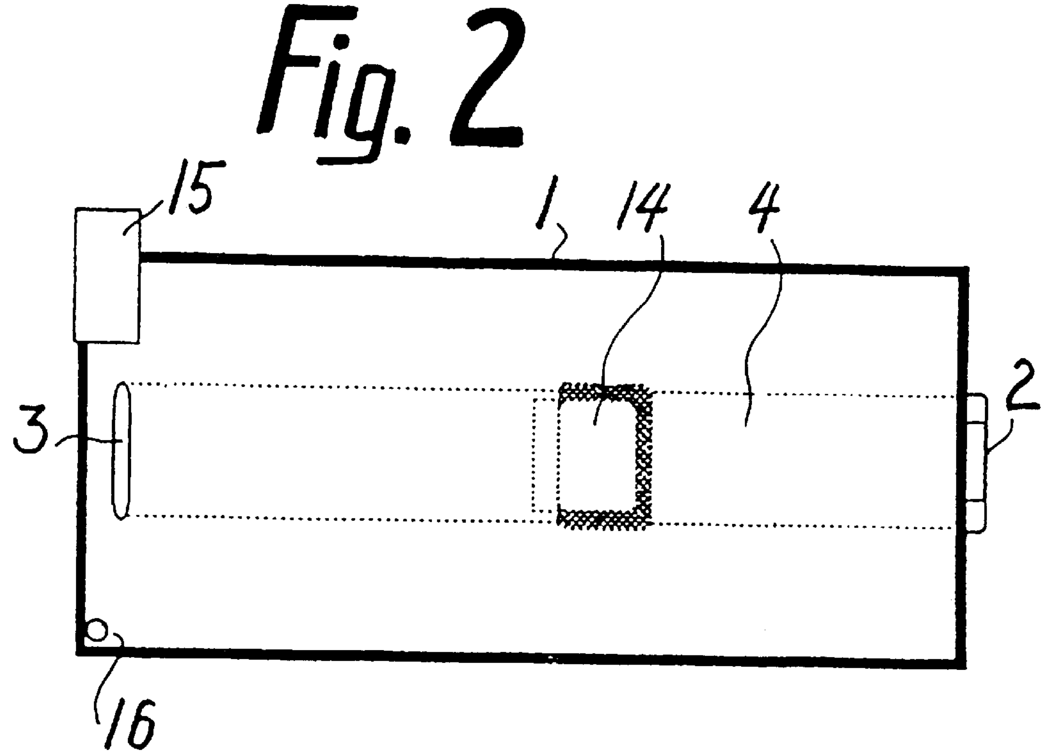
FIG. 2 shows a schematic horizontal cross-section of the gate reader.

The shown gate reader also has an LCD-screen 15. This screen can be rotated. An alternative connection point for the LCD-screen, for inverted gates/embarkation points, is indicated by 16 (FIG. 2).

When a customer arrives at the here shown and described device, the person inserts the ticket or control-slip into the opening 2. The ticket is automatically moved along pathway 4 by the directional pincer-rollers 10. During transport the data on the magnetic-stripe is decoded and if necessary decoding of the updated coding, whereupon the ticket or control/pass-slip passes the graphic printing-module 14 for conditional visible print-update. Thereafter the control/pass-slip continues forwards, cut if necessary (at 11), whereupon the part that the customer is to retain is directed via the sorting station/mechanism 5, to the ejection opening 3, while the part that is to be retained at the actual control/exit-point is directed via a separate path 7 to a not shown storage bin.

If decoded data is invalid—the gate reader is connected to a Central Process Unit—a signal is given to update the invalid data on the otherwise valid/rightful ticket, or it is possible to signal activation of the storage-hopper 12 so that an attached not shown mechanism ensures supply of a control-slip from storage-hopper 12 to pathway 4. From the Central Processing Unit comes a signal which activates a magnetic coding-mechanism 17. The original or new control-slip moves on the graphic printing-module 14, where corresponding information is printed. The control-slip then moves on, and is delivered at the ejection opening 3. Upon re-issue the originally inserted ticket or control-slip can be forwarded to one of the mentioned, not shown storage bins via one of the paths 7, or be returned to the customer at the ejection opening 3, almost simultaneously with a new slip.

Positioning of a graphic printing-module, together with the hopper with blank control-slips, will in most cases solve the problem of interrupted passing of the exit/control-point due to outdated information on the control-slip.

The gate reader can easily be modified or be connected so that if the person passing the exit/control-point is recognized as rightful in passing without beforehand holding a control/slip (the person has identified him/herself via, for instance, a connected credit-card reader which is embodied in the magnetic decoding/coding mechanism 8), a control-slip can be fed from the secured storage-hopper 12 and via a sorting-mechanism 9 be brought in position on the horizontal pathway 4, and be updated as if it had come from the insertion opening 2.

A substantial improvement one achieves with the invention is also that passengers with "seat at gate" (possible "standby") status, do not require extensive manual handling, but can just board as others, when their name (for instance) is called.

What is claimed is:

1. A gate reader for reading and updating a data carrying medium which carries both encoded information and visibly readable symbols corresponding to the encoded information, comprising:

a housing having a receiving slot for receiving the data carrying medium, an exit slot for ejecting one of the data carrying medium and a new data carrier that is a substitute for the data carrying medium, and a primary pathway connecting said two slots for conveying the data carrying medium and the new data carrier;

a container for storing a blank new data carrier, and a further pathway connecting said container to said primary pathway for conveying the blank new data carrier onto said primary pathway;

decoding and updating means adjacent to said primary pathway for reading the encoded information on the data carrying medium, and for updating the encoded information on the data carrying medium and writing encoded information onto the blank new data carrier based on information from a source of information that is external to said housing that is related to the information carried by the data carrying medium, said decoding and updating means for being connected to the source of information to determine whether the encoded information is correct, whether the encoded information should be updated if the encoded information is not correct, and whether the new data carrier should be issued to replace the data carrying medium;

a printer adjacent to said primary pathway for printing updated visibly readable symbols onto the data carrying medium if the encoded information is to be updated and for printing the visibly readable symbols onto the blank new data carrier if the new data carrier is to be issued, based on information from the external source of information; and a discard pathway connected to said primary pathway for disposing of the data carrying medium if the new data carrier is to be issued.

2. The gate reader of claim 1, further comprising a display on said housing for displaying the information carried by the data carrying medium and the new data carrier.

3. The gate reader of claim 1, wherein said decoding and updating means comprises a data reader for reading the encoded information on the data carrying medium, and a separate data writer spaced from said data reader for updating the encoded information on the data carrying medium and writing encoded information onto the blank new data carrier.

4. The gate reader of claim 3, wherein from said receiving slot to said exit slot, the following are arrayed in the following order along said primary pathway, said data reader, an intersection with said further pathway, said data writer, said printer, and an intersection with said discard pathway.

5. The gate reader of claim 1, further comprising a cutter on said primary pathway for removing a portion of the data carrying medium.

6. The gate reader of claim 5, further comprising a secondary pathway connected to said primary pathway for conveying the removed portion of the data carrying medium.

7. The gate reader of claim 1, wherein the data carrying medium is an airline boarding pass in which the encoded information is magnetically encoded, and wherein said primary pathway is sized to convey the airline boarding pass and said decoding and updating means are arranged and constructed for reading, updating, and writing the magnetically encoded information.

8. The gate reader of claim 1, wherein said receiving slot is adjacent to one end of said housing and said exit slot is adjacent to an opposite end of said housing.

9. A method of reading and updating an airline boarding pass at an airline boarding gate, the airline boarding pass carrying both magnetically encoded information and visibly readable symbols corresponding to the encoded information, the method comprising the steps of:

storing a new boarding slip in blank in a housing, the new boarding slip being a substitute for the airline boarding pass when information is placed thereon;

placing the airline boarding pass into a receiving slot in the housing and conveying the airline boarding pass through the housing along a primary pathway toward an exit slot;

decoding the encoded information on the airline boarding pass as it moves along the primary pathway;

evaluating the decoded information in an evaluation unit in the housing to be able to determine whether the encoded information is correct, whether the encoded information should be updated if the encoded information is not correct, and whether the new boarding slip should be issued to replace the airline boarding pass, the evaluation being based on airline boarding information relevant to the airline boarding pass from a source external to the housing that is connected to the evaluation unit;

if the encoded information is correct, ejecting the airline boarding pass from the exit slot;

if the encoded information needs to be updated, updating the encoded information on the airline boarding pass with an encoder unit adjacent the primary pathway, printing the updated visibly readable symbols onto the airline boarding pass with a printer adjacent the primary pathway, and then ejecting the updated airline boarding pass from the exit slot; and if a new boarding slip is to be issued, conveying a blank new boarding slip to the primary pathway, encoding the encoded information onto the blank new boarding slip using the encoder unit based on the airline boarding information from the external source, printing corresponding visibly readable symbols onto the blank new boarding slip using the printer, disposing of the airline boarding pass, and ejecting the new boarding slip from the exit slot.

* * * * *